INVENTORS
WOLF R. VIETH
SEYMOUR G. GILBERT
SHAW S. WANG
RAKESH SAINI

BY *Oblon, Fisher & Spivak*
ATTORNEYS

United States Patent Office 3,758,396
Patented Sept. 11, 1973

3,758,396
PREPARATION OF IMMOBILIZED ENZYME-MEMBRANE COMPLEXES BY ELECTRO-CODEPOSITION
Wolf R. Vieth, Belle Mead, Shaw S. Wang, North Brunswick, Seymour G. Gilbert, Piscataway, and Rakesh Saini, New Brunswick, N.J., assignors to Research Corporation, New York, N.Y.
Filed Aug. 31, 1971, Ser. No. 176,546
Int. Cl. B01k 5/02
U.S. Cl. 204—181         21 Claims

ABSTRACT OF THE DISCLOSURE

Immobilized enzyme-membrane complexes are prepared by adjusting the pH of an aqueous mixture of an active enzyme and an enzyme-immobilizing carrier material so that the enzyme and the carrier material both experience charge separation at the molecular or colloidal levels, and introducing the aqueous mixture into an electro-deposition vessel provided with at least one cathode and at least one anode across which an electrical potential is applied to deposit an immobilized enzyme-membrane complex of enzyme and carrier material onto the surface of at least one of the electrodes. This process is particularly suitable for coating immobilized enzyme-membrane complexes onto geometric supports used for biocatalytic modules. The process can be adapted for continuous manufacture of enzyme-membrane complexes simply by making one of the electrodes a moving roll with a means of continuous stripping.

BACKGROUND OF THE INVENTION

Field of the invention

This invention relates to electrodeposition of immobilized enzyme-membrane complexes. More particularly, this invention relates to a process for electrodeposition of immobilized enzyme-membrane complexes so as to form coated supports of various geometrical configurations, which are suitable for use as biocatalytic modules. This invention also provides a process for continuous casting, drying, and stripping of immobilized enzyme-membrane complexes.

Description of the prior art

Enzymes are protein catalysts which have been used for a wide variety of industrial and research applications, particularly in fermentation, pharmaceuticals, clinical testing, paper and textile processing, etc. They are highly specific in their activity and generally do not generate significant quantities of undesirable byproducts. Enzyme reactions are industrially advantageous since they do not require a large investment in heat transfer equipment and can be easily staged, thereby minimizing the problems associated with interstage product separations.

To alleviate many of the problems associated with separating or recovering the enzyme materials in reactions effected by simple admixing of an enzyme and substrate and thereafter inactivating and/or recovering the enzymes from the products or unreacted substrate following the reaction, the art has developed various so-called "immobilized enzymes" in which an active enzyme is immobilized or bound to inert or insoluble carriers. A wide variety of carriers have been proposed in the prior art, depending upon the particular type of enzyme used and the particular enzymatic reaction desired. Prior art methods of preparing immobilized enzymes have included direct covalent bonding, indirect bonding through an intermediate compound, cross-linking of the enzyme, or trapping the enzyme in polymer lattices.

Many prior art techniques are known for the electrodeposition of film-forming materials. For instance, Mizuguchi et al. U.S. Pat. 3,556,969 discloses electrodeposition of protein fibrils, but does not prepare enzymatically active immobilized enzyme-membrane complexes therefrom.

One problem associated with many prior art immobilized enzymes is that they are generally packed into a chromatographic column or the like, and reacted by passing a substrate solution therethrough. Packing requires time and effort, since the filled column must be washed initially to pack the immobilized enzyme granules, and washed again when a different enzyme or substrate is to be used. In co-pending patent application Ser. No. 135,753, filed Apr. 20, 1971, there is described a method for immobilizing enzymes by complexing the enzymes with a protein or polypeptide carrier, giving an insoluble complex which can be used in membrane form. In co-pending patent application Ser. No. 148,018, filed May 28, 1971, these or similar immobilized enzyme-membrane complexes are formed into biocatalytic modules. The disclosures of these co-pending applications are incorporated herein by reference.

While the discovery and the use of immobilized enzymes in membrane form has alleviated many of the disadvantages of prior art granular immobilized enzymes, the preparation of such materials has heretofore been relatively time-consuming, and has required the use of relatively pure starting materials to obtain a high degree of activity. Furthermore, due to the physical properties of water-insoluble film carriers, the preparation of biocatalytic modules has heretofore been limited to enzyme carriers having physical properties in membrane form which permitted fairly extensive handling, as in wrapping a membranous film about a support configuration.

A need exists, therefore, for a process of preparing immobilized enzyme-membrane complexes in various geometrical configurations, which is suitable for a wide number of water-insoluble carriers. Additionally, a need exists for a process of preparing biocatalytic modules of the types described in the aforementioned co-pending application which do not require the use of relatively pure materials, and which is simple and less time-consuming than mechanical wrapping. Also, there is a need for a process whereby wrappable immobilized enzyme-membrane complexes may be prepared. The present invention fills such needs.

SUMMARY OF THE INVENTION

Accordingly, it is one object of this invention to provide a process for depositing immobilized enzyme-membrane complexes onto shaped supports.

It is another object of this invention to provide a process for codeposition of an active enzyme and an enzyme-immobilizing carrier onto shaped surfaces of a biocatalytic reactor.

Another object of this invention is to provide a process for codeposition of chemically coupled enzymes and their water insoluble carriers onto a shaped base.

A further object of this invention is to provide a process for simultaneously purifying enzyme solutions while codepositing an active enzyme and its water-insoluble carrier onto a shaped base.

An additional object of this invention is to provide a process for preparing thin, membranous coatings of immobilized enzyme-membrane complexes which are free of pinhole defects.

Still another object of this invention is to provide a process for continuous casting, drying, and stripping of electrodeposited enzyme-membrane complexes.

These and other objects have now been attained in one aspect of the present invention by providing a process for electrodeposition of an immobilized enzyme-membrane complex which comprises preparing an aqueous mixture of an active enzyme and an enzyme-immobilizing carrier; adjusting the pH of the aqueous mixture to a point at which both the enzyme and its carrier experience charge separation at the molecular or colloidal levels; introducing the aqueous mixture into an electrodeposition vessel provided with electrodes comprising at least one cathode and at least one anode; and applying an electrical potential between the electrodes to deposit an immobilized enzyme-membrane complex of the enzyme and carrier on the surface of at least one predetermined electrode.

BRIEF DESCRIPTION OF THE DRAWINGS

These and other objects, features, and advantages of the present invention will become more fully apparent to those skilled in the art by reference to the following description and example of illustrative preferred embodiments of the invention together with the annexed drawings, wherein like reference numerals designate like or corresponding parts throughout the several figures, and in which.

DESCRIPTION OF THE PREFERRED EMBODIMENTS

Figure 1:
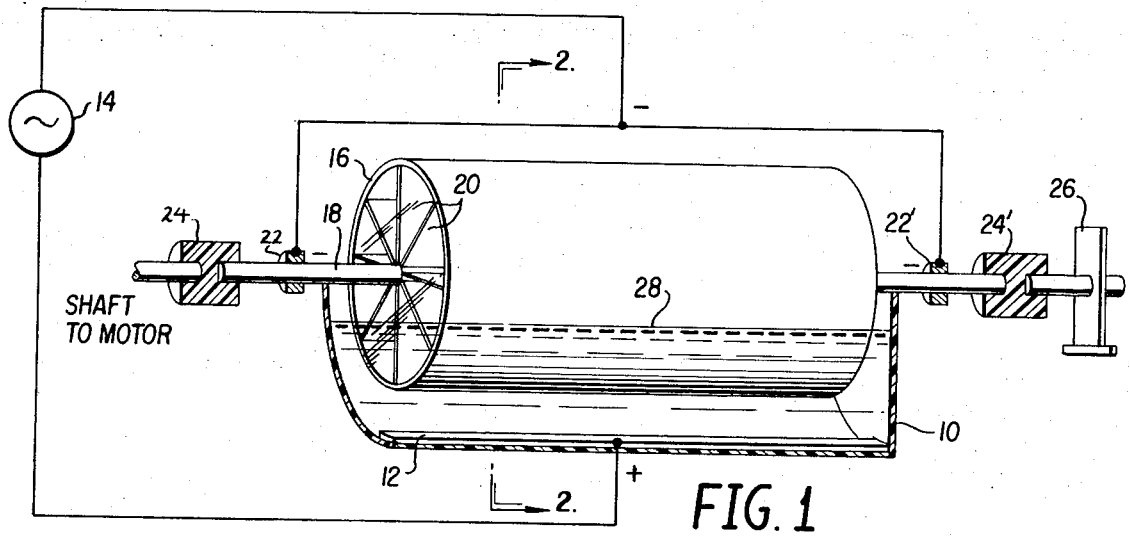
FIG. 1 is a perspective view of one apparatus suitable for the electrodeposition of an immobilized enzyme-membrane complex on a revolving drum.

In brief summary, the process of the present invention involves preparing a solution or dispersion of an active enzyme and a water-insoluble carrier material therefor, adjusting the pH thereof, and simultaneously electrodepositing the enzyme and its carrier onto a suitable supporting base.

Any enzyme capable of existing in or on a membrane, film or sheet may be used in accordance with the present invention. For instance, suitable enzymes include amylases, lysozyme, invertase, urease, cellulases, catecholmethyltransferase, sucrose 6 - glycosyl-transferase, carboxyl esterase, aryl esterase, lipase, pectin esterase, glucoamylase, amylopectin-1, 6-glucosidase, oligo-1, 6-glucosidase, poly-galacturonase, $\alpha$-glucosidase, $\beta$-glucosidase, $\beta$-galactosidase, glucose oxidase, galactose oxidase, catechol oxidase, catalase, peroxidase, lipoxidase, glucose isomerase, pentosanases, cellobiase, xylose isomerase, sulphite oxidase, ethanolamine oxidase, penicillinase, carbonic anhydrase, gluconolactonase, 3-keto steroid-$\Delta'$-dehydrogenase, 11-$\beta$-hydroxylase, amino acid acrylases, pepsin, trypsin, papain, ficin, subtilisin and bromelin. Compatible combinations of enzymes and multienzyme systems can also be complexed.

Since an enzyme is a protein, it has a net electrical charge at a pH on either side of its isoelectric point and can migrate under the influence of an electric field.

Suitable carrier materials are those having a net electrical charge at a given pH which can also migrate under the influence of an electric field. Both the enzyme and carrier material need not exist in charged form if they form a complex in solution or dispersion since either the enzyme or carrier, if in charged form, will then provide a net charge for the complex.

In general, immobilized enzymes capable of existing in or on a membrane, film or sheet include a wide variety of enzymes complexed with proteins, polypeptides, synthetic polymers or other carriers. For instance, suitable protein materials include collagen, zein, casein, ovalbumin, wheat gluten, fibrinogen, myosin, mucoprotein, and the like. Of these, zein and collagen are particularly preferred due to their ease of handling. Suitable synthetic polypeptide carriers include polyglutamate, polyaspartate, polyphenylalanine, polystyrosine, and copolymers of leucine with p-amino phenylalanine. Suitable synthetic polymer carriers include copolymers of methacrylic acid and methacrylic acid-3-fluoro-4,6-dinitroanilide; copolymers of ethylene and maleic anhydride; styrene polymers containing nitrofluorobenzene sulfonyl groups; carboxymethyl cellulose; DEAE-cellulose; other carboxylic resins; polyamides; polyaminostyrenes; etc. Such films or membranes may contain one or more enzymes (e.g., a combination of amylases). For electrocodeposition of proteolytic enzymes, preferred carriers include carboxy methyl cellulose, diethyl-amino-ethyl cellulose, poly(amino styrene) and others.

The first step in electro-codeposition in accordance with the present invention is to form a dilute dispersion or solution of the enzyme and its carrier.

The enzyme-carrier solution or dispersion may be prepared in any suitable conductive media. The compositions of the conductive media vary with the carriers used. In some cases, the use of an aqueous alcohol media facilitates dispersion of the carrier material. For example, collagen is preferably dispersed in a methanol-water mixture, while zein is preferably dissolved in an isopropanol-water mixture. The concentration of the carrier material in the dispersion or solution will generally range from about 0.1% to about 5.0% weight. When collagen is used, suspensions containing more than 1.0% by weight of collagen tend to become too viscous, thereby impeding migration of the particles. Accordingly, suspensions of from 0.1% to 1.0% by weight are usually desired. Generally, the viscosity of the resultant dispersion will be the determining factor deciding how much carrier material is to be added thereto.

The amount of enzyme to be applied to the aqueous dispersion will depend upon the area of the support to be coated, the degree of activity desired in the final product, the activity of the enzyme preparation being used, and the particular enzyme and carrier material being used. Generally, the amount of enzyme added at this stage (based on the dry weight of the carrier used) will range from 10 to 200%, usually 30 to 100%, and preferably 40 to 60%, depending on the individual enzyme. The optimal amount for a given system can be readily determined, since the use of too little enzyme will result in a deposited immobilized enzyme membrane complex of low activity, while the use of an excessive amount of enzyme is economically wasteful.

The choice of electrically conductive material for use as the anodes and cathodes will be determined, at least with respect to the electrode upon which the immobilized enzyme-membrane complex is to be deposited, by the desired physical characteristics in the biocatalytic module or other structure being prepared. As for the other electrode, essentially any electrically conductive material may usually be employed. Suitable electrically conductive materials include iron, stainless steel, copper, gold, platinum, nickel or other biochemically inert metals or alloys thereof; a noble metal plated on a base metal; graphite or other electro-conductive powders, such as graphite shaped with a binder (e.g., paraffin, synthetic resin, or the like). In general, heavy metals such as silver and lead are not suitable for use as electrodes, since a few enzymes are extremely sensitive to low concentrations of such metals. On the other hand, some enzymes, especially a number of peptidases, require metal atoms, without which they are inactive. Still other enzymes are activated by specific metal ions. In these cases, the use of the specific metal in the electrode could be beneficial to the activity of the enzyme-membrane complex.

A unique advantage of the process of the present invention is that pre-shaped electrodes may be used, thus enabling uniform distribution of the immobilized enzyme-membrane complexes on irregularly shaped supports.

Neither the support base nor the electrodeposited coating need be subjected to a great deal of handling following the treatment of the present invention. Accordingly, it is possible to obtain satisfactory enzyme activity with thin coatings, since the immobilized enzyme-membrane complex is not subjected to mechanical stress and thus need not be as thick as if wrapping or other techniques are used to apply it to a supporting base. Of course, if desired, the immobilized enzyme-membrane complex may be removed from the support for subsequent use following electro-codeposition, but in many instances this will not be necessary.

In the case where large amounts of immobilized-enzyme membrane are desired, a continuous casting method can be used. Such an arrangement can, for example, use a cylindrical roller as the electrode for the codeposition of the enzyme and carrier, and a conductive vessel which serves both as the container for the electrolytes and as the other electrode. The roller is partially immersed in the electrolytes so that the uncovered part of the roller provides a surface for drying of the deposited film. A continuous stripping mechanism such as a doctor blade can also be employed.

The aqueous solution of enzyme and support is adjusted to a pH at which both the enzyme and its carrier exist with charge separation at the molecular or colloidal levels. In order for both the enzyme and its support to migrate to the same electrode, both must generally exist in a similarly charged state, e.g., as poly(anions) or poly(cations). Accordingly, the pH can be adjusted to either side of the range of isoelectric points of the material to be deposited. In some instances, the support material may be at its isoelectric point or even slightly outside the aforementioned range, but will form a complex with the enzyme having a net charge which will permit both the enzyme and its support to migrate to the same electrode. This is easily accomplished merely by the addition of buffers, acids or bases, to bring the solution to a pH either above or below both isoelectric points. By this simple technique, both the enzyme and its carrier exist as poly(anions) or poly(cations), and will migrate to the same electrode. The concentration of electrolyte impurities in the aqueous solution or suspension is preferably kept low, since the presence of a high concentration of electrolytes causes excessive current flow and adversely affects the quality of the electrodeposited product. Additionally, minimizing the presence of electrolytes as far as possible favors electrophoresis over electrolysis, which is desirable. Ageing of the dispersion for periods up to a week facilitates pre-complexation, resulting in improved electro-codeposition complexes.

The aqueous mixture is then introduced into an electrodeposition vessel which is provided with at least one cathode and at least one anode. One of these electrodes may be the vessel itself, or separate electrodes may be used. In the former case, of course, the electrodeposition vessel will be conductive, such as a stainless steel flask or the like. The immobilized-enzyme-membrane complex can be deposited on subdivided homo-electrodes such as a group of beads, a bundle of rods, or the like.

An electrical potential is then applied between the two electrodes to deposit an immobilized enzyme-membrane complex of the enzyme and carrier on the surface of one electrode, coating it with an immobilized enzyme-membrane complex. Voltage and current requirements are dependent upon the dimensional parameters of a given system, such as the area of the support to be coated, the distance between electrodes, the temperature, and the concentration of materials and electrolytes in the aqueous mixture. Generally, it is preferable to use a relatively low voltage supply, such as from about 10 to 100 volts. The actual current requirements are quite small, generally from 1 to 10 amperes. Working at low voltages avoids an undesirable increase in temperature, which may denature the enzyme or its carrier, and also tends to favor electrophoresis over electrolysis. Voltages for a given application can be readily determined by simple trial and error.

If desired, a semipermeable diaphragm may be provided in the electrodeposition vessel between the cathode and anode, confining the dispersion to be deposited to one side of the diaphragm. This has the advantage that no enzyme or carrier material is deposited by accretion on the electrode which is not immersed within the aqueous suspension, thereby avoiding loss of material. Additionally, the regulation of pH is simplified, since it changes more slowly in the chamber containing the electrode support being coated. Thus, in some applications where a particularly high quality coating is desired, the use of diaphragms may be advantageous.

Temperatures are not critical except within a broad range. Of course, the temperature during electrodeposition must be kept above the freezing point of the enzyme carrier solution or suspension, and below a temperature at which the enzyme or carrier will become heat-activated or denatured. Generally, temperatures between 0 to 25° C. will be preferred convenient working temperatures.

The time required to deposit an active immobilized enzyme-membrane complex on the support will vary according to the concentration of enzyme, the surface area of the support being deposited, the temperature, and the current being applied. Using the process of this invention, it is possible to deposit extremely thin films, such as 0.1 mil (0.0025 mm.) in thickness. The thickness of the films which can be applied according to this process generally range from 0.0025 mm. to 0.050 mm., preferably from 0.005 to 0.025 mm. In continuous electrocodeposition and stripping of the enzyme carrier membrane, a thicker film is preferred because of desirable higher mechanical strength. When pre-shaped electrodes are used and intended to be used as such, a thin deposited film is economically desirable. The thickness of the film can be readily controlled by adjusting the voltage and time of electrodeposition. In the case of continuous casting using a cylindrical roller, the thickness of the film can be controlled by varying the voltage applied and/or the speed of the roller.

A unique feature of using electro-deposition to form shaped bases coated with immobilized enzyme-membrane complexes is that pinholes are substantially eliminated. During processing, the occurrence of pinholes in the film will decrease the electrical resistance in that region, causing an increased current flow therethrough and thereby filling and closing the pinholes to a thickness substantially identical to that of the remainder of the deposited film.

If desired, additional materials, such as plasticizers or insolubilizers and the like may be added to the solution or suspension prior to electrodeposition. Depending upon the particular polymeric carrier material being utilized, a variety of plasticizers or cross-linking agents may be used to impart desired properties such as resiliency, flexibility, or surface toughness to the final products. Also, enzyme stabilizers or other additives may be used if desired.

Illustrative plasticizers which may be used include gelatin for collagen, 1,5 pentane-diol for zeon, etc. Preferably, organic acids or bases will be used to adjust the pH, since they also have a plasticizing effect.

Illustrative cross-linking agents which may be used include chloro-s-triazine, diisocyanates as described in the prior art, etc. Cross-linking may take place either before or after electrodeposition. Of course, cross-linking agents which may denature the enzyme must be avoided.

After a suitably thick layer of immobilized enzyme-membrane complex has been deposited on the supporting base, the coating is dried for use. If desired, a plurality of thin coatings may be applied with drying taking place intermittently during their application. With very thin films, such a plurality of coatings can be used for enzyme pairs such as glucose oxidase and gluconolactonase; glucoamylase and glucose isomerase; etc., and for more complicated multienzyme systems. If diffusion of the substrate through the membranes is a limting factor, different enzymes can be deposited separately on different parts of the same support. The dried coatings exhibit good storage stability and may be used either with or without further treatment.

Figure 2:
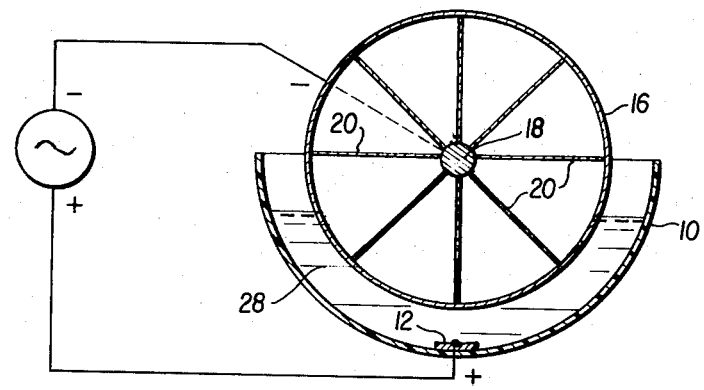
FIG. 2 is a cross-sectional view, taken along line 2—2 of FIG. 1, showing the use of conductive fins to distribute the electrical charge uniformly on the revolving drum surface.
Figure 3:
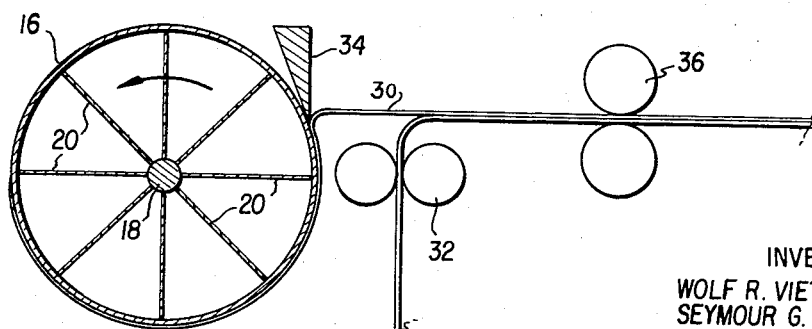
FIG. 3 is a schematic side view showing continuous stripping of an immobilized enzyme-membrane complex and layering it onto a supporting film.

Referring briefly to the drawings, FIGS. 1–3 show one preferred embodiment of the present invention. A non-conductive electrodeposition vessel 10 is provided with an elongate electrode 12 extending along the length thereof and being wired to one terminal of a D.C. power source 14. A conductive drum 16 is used as the electrodeposition electrode and is mounted on a conductive axle shaft 18 with a plurality of conductive fins 20 radiating from axle shaft 18 to drum 16 to assure uniform charge distribution along the drum surface. (See FIG. 2.) The axis of drum 16 is parallel to electrode 12 to assure constant spacing therebetween. Conductive friction bearings 22, 22' make electrical contact with axle shaft 18 on each side of drum 16, and are wire to the other terminal of D.C. power source 14. To prevent grounding, insulating members 24, 24' break electrical contact between axle shaft 18 and shaft supports 26, 26'. A motor (not shown) is connected to axle shaft 18 to power rotation of drum 16.

A dispersion 28 of enzyme and support, adjusted to the proper pH, is poured into electrodeposition vessel 10 to immerse electrode 12 and a portion of drum 16, and the drum is rotated. Upon application of voltage from D.C. power source, electrodeposition of an immobilized enzyme-membrane complex takes place on the surface of drum 16.

Referring now to FIG. 3, the deposited immobilized enzyme-membrane complex film 30 may be layered directly onto a supporting base film 32 for drying and further treatment such as tanning, packing into a biocatalytic module, or the like. A doctor blade 34 removes film 30 from the surface of drum 16. Rolls of supporting base film 32 provide a support at the same lineal speed at which film 30 is removed from the drum surface. The two films 30 and 32 are passed through a pair of nip rolls 36 to assure uniform contact between the membrane and its supporting film.

An additional advantage of the process of this invention is that enzyme preparations of relatively low purity may be used, since the prior art two-stage process of enzyme isolation or purification and subsequent insolubilization is reduced to a simultaneous one-stage process in which the above two operations take place concurrently. Many commercially available enzyme preparations contain contaminating enzymes which adversely affect the stability of immobilized enzyme-membrane complexes prepared using these materials. For example, glucoamylase is highly desirable for many applications, since it converts starch directly to glucose. However, as with many of the amylases, glucoamylase preparations are almost invariably contaminated with proteases, which adversely affect the stability of both the enzyme and its membrane. In accordance with the process of the present invention, protease-free amylase complexes are readily obtained during electrodeposition without the necessity of costly and time-consuming separate purification procedures.

Having now generally described the invention, a further understanding thereof may be obtained by reference to the following illustrative examples, which are included herein for the purposes of illustration, and are not intended to be limiting unless so specified.

EXAMPLE 1

This example demonstrates the preparation of enzymatically active coatings comprising a lysozyme-zein immobilized enzyme-membrane complex.

50 grams of zein were dissolved in 300 ml. of a 50% aqueous isopropanol solution, and the pH adjusted to 2.9 by the addition of lactic acid. 300 mg. of an aqueous lysozyme solution was added, and the mixture stirred for 1 hour prior to electrodeposition. Two stainless steel electrodes having dimensions of 11.5 x 6.2 x 0.1 cm. were immersed in the solution, and a potential of 50 volts was applied between the electrodes for 3 hours, with an initial current of 0.6 amp. A cam arrangement was used to raise the electrodes in and out of the mixture at 10 cycles per minute, to provide layer-by-layer drying of the deposited membrane, and to avoid over-heating of the enzyme-membrane solution. After 3 hours, the lysozyme-zein immobilized enzyme-membrane complex which was formed on the cathode was allowed to dry, and then peeled off and assayed for lysozyme activity.

50 ml. of a *Micrococcus lysodeikticus* suspension containing 300 mg. per liter was used as the substrate, and assayed at pH 7 and 28° C. Enzyme activity was followed by changes in the optical density of the cell suspension at 450 millimicrons after 10 minutes contact time. Three runs were performed, and the immobilized-enzyme-membrane complex was washed with 1 liter of water between runs. Following some loss in enzyme activity after the first run, the immobilized enzyme-membrane complex reached a stable plateau of enzyme activity. The first run showed 13.1% conversion after 10 minutes of contact time, the second run showed 8.2%, and the third run showed 8.1%.

EXAMPLE 2

This example illustrates the electrodeposition of enzymatically active coatings onto shaped supports which may be used to form biocatalytic reactors.

500 mg. of invertase in aqueous solution were added to 200 ml. of a 1% collagen dispersion. The mixture was brought to a volume of 600 ml. by the addition of water, the pH adjusted to 3 by the addition of lactic acid, and the acidified mixture stirred for 15 minutes.

A cathode was prepared by shaping a 50 cm. long and 0.15 cm. diameter stainless steel wire into a helix. As the anode, a disc-shaped platinum electrode, 6.9 cm. in diameter and 0.017 cm. thick, was used. The electrodes were immersed into the collagen-invertase mixture, and a potential of 50 volts was applied across the platinum electrode. Using the cam arrangement of Example 1, the electrodeposition was carried out for 55 minutes, after which a collagen-invertase complex deposited on the helix was dried for 25 minutes.

A biocatalytic module was formed by packing the helix in a glass housing 2 cm. long and 4.2 cm. in diameter. Invertase activity was assayed by passing 100 ml. of a 6% sucrose solution through the housing at a flow rate of 150 ml. per minute. The change in optical rotation of the reaction solution was recorded, and used to calculate the percent conversion of the sucrose substrate at different reaction times. After each run, the helix, with the membrane coating intact, was washed with 1 liter of water. Four runs were made, after which it was observed that there had been disintegration of the immobilized enzyme membrane complex from the surface of the helix. A total of 117 mg. immobilized enzyme-membrane complex was deposited on the helix. In repetitive enzymatic analysis, percent conversions in 60 minutes of contact time were, respectively, 27.0; 12.9; 10.7; and 10.7.

It will be apparent that, utilizing the technique illustrated in this example, biocatalytic module components such as helices can be prepared with sequential deposition of a plurality of enzymes, either by layering one enzyme over the other, or by first coating one end of the helix with a first enzyme, followed by coating the other end of the helix with a second enzyme.

EXAMPLE 3

This example demonstrates simultaneous one-step enzyme purification and complexation. While it is impossible to prepare immobilized enzyme-membrane complexes of glucoamylase and collagen which are stable and have a long shelf life when using conventional casting techniques and low purity enzyme preparations, preparation of such complexes by electrodeposition from an impure grade of glucoamylase containing protease and other enzyme contaminants gives highly satisfactory results.

150 grams of crude glucoamylase (grade II from a Rhizopus genus mold, supplied by Sigma Chemical Co.) was dissolved in 30 ml. of water, and added to 150 ml. of a collagen dispersion. The mixture was agitated, and diluted with water to a volume of 300 ml. The pH was adjusted to 3, and stirring was continued for 15 minutes.

A direct current potential of 50 volts was applied across the two stainless steel electrodes used in Example 1, using the same cam arrangement. Electrodeposition continued for 1½ hours, and the film was then dried at the cathode for 6 hours. The collagen-glucoamylase complex was then peeled off and tested for glucoamylase activity.

The membrane was successfully used 4 times, with washing between runs, to catalyze the transformation of a 1% starch solution to glucose. As compared with ordinary complexes of these materials prepared by casting, the cast films were degraded by the protease during the enzyme impregnation step, and were unstable. However, films prepared from the same material using the electrodeposition method of this invention showed very little disintegration of the film, even after repeated use. The collagen-glucoamylase complex membrane remained intact, even after a contact time of 24 hours with shaking at 45° C. Glucoamylase activity was detected by the use of Clinistix strips (Ames Company, Division of Miles Laboratories), which is a semi-quantitative colorometric test for detecting glucose when present in more than 0.5% by weight of the solution tested.

EXAMPLE 4

This example illustrates both the use of covalently bonded immobilized enzyme-membrane complexes, and a continuous process for preparing membranous films by electrolytic deposition.

An immobilized enzyme-membrane complex was prepared by coupling invertase through triazine to carboxymethylcellulose (CMC). 5 grams of CMC were dissolved in 400 ml. of phosphate buffer at pH 7 by heating and stirring. 400 mg. of invertase, dissolved in 80 ml. of water, were added to the mixture with stirring. 62 milligrams of triazine dissolved in 20 ml. of 50% aqueous acetone were added dropwise, with high speed stirring. Stirring was continued for 8 minutes. The pH of the mixture was adjusted to 7.7 by adding TRIS buffer.

The apparatus used was that shown in FIGS. 1 and 2. As the electrolytic deposition vessel 10, a Lucite container was used, with the platinum electrode 12 previously described used as the cathode and placed in the bottom thereof. A revolving stainless steel drum 16, approximately 4 inches by 4 inches, was used as the anode. The drum rotated on a stainless steel shaft 18, and fins 20 from the shaft to the drum were provided in order to uniformly distribute the charge on the drum surface. The drum was partially immersed in the CMC-triazine-invertase mixture, and set to revolve at 12 r.p.m. A potential of 20 volts D.C. was applied, and electrodeposition was continued for 20 minutes. To prevent heating of the solution, air was blown across the electrodeposition vessel by venting it to a hood. Two samples of dried film were recovered, tanned with 100 ml. of 11.6 weight percent chromium sulphate solution for 10 minutes followed by a 2 minute washing in cold water, dried, and assayed for invertase activity. A 60 milligram dry weight sample assayed with 20 ml. of a 6% buffered sucrose solution, pH 5, at 30° C., showed at the end of 1 hour a 33% conversion of the substrate. After washing with 200 ml. of distilled water, repetition of this experiment showed 28.5% conversion. Repeated a third time, 17% conversion was obtained.

EXAMPLE 5

Many enzyme systems require a presence of trace amounts of metals for optimal activity. This example demonstrates the preparation of immobilized enzyme-membrane complexes containing trace amounts of metals, using electrodeposition techniques.

300 mg. of lysozyme dissolved in water were added to 100 ml. of a 1% collagen dispersion. The mixture was stirred for 15 minutes, diluted to 250 ml., and adjusted to a pH of 3.

A Lucite half-cylinder was used as the electrodeposition vessel. A brass screen was fitted to the inside of the half-cylinder, and wired as the anode. A revolving Lucite cylinder was covered on the outside surface with a stainless steel screen, which was used as the cathode. Continuous electrical contact was made by stationary copper electrode lips touching each end of the stainless steel screen as it revolved. By centering the revolving cylinder in the electrodeposition vessel, a uniform distance between the brass screen anode and the stainless steel cathode was obtained.

The enzyme-membrane mixture was added to the bath, and replenished as the liquid level dropped. The cathode was rotated at 12 r.p.m., and a D.C. potential of 20 volts was applied for 1 hour. Blowing air over the apparatus helped to keep the temperature low while deposition was taking place. A collagen-lysozyme-copper immobilized enzyme-membrane complex was produced uniformly over the stainless steel screen cathode, and allowed to dry. The membrane was blue due to the presence of some copper, which was released from the brass anode and deposited on the cathode along with the enzyme and its membrane.

A portion of the dried membrane was peeled off the screen, washed with 500 ml. distilled water, and tested for lysozyme activity. 50 ml. of a *Micrococcus lysodeikticus* solution at pH 7, containing 100 mg. per liter of cells was used as the substrate at a temperature of 20° C. In the first run, 67.8% of the substrate was transformed during 11 minutes of contact time. Following washing with 500 ml. of water, the run was repeated, showing a conversion of 69%. Not only did the copper not bleach out of the film with washing, but, unlike films prepared without the added metal, there was no drop of enzyme activity after the first washing.

It will be appreciated that, in addition to adding metals to an immobilized enzyme-membrane complex for their physical properties, certain metals or cofactors required for some enzymes may be electrodeposited along with the enzyme-membrane complexes, and that these metals need not be present in a substrate solution. Furthermore, they may be reused, since they remain in the enzyme-membrane complex.

EXAMPLE 6

This example demonstrates the preparation of coatings comprising an invertase-collagen immobilized enzyme-membrane complex, followed by tanning.

200 ml. of a 1% collagen dispersion was mixed with 2.4 grams of powdered invertase and 0.5 gram Knox brand gelatin, which was added as a plasticizer. The mixture was diluted with water to a final volume of 500 ml., and the pH adjusted to 3 by the addition of lactic acid. A potential of 50 volts was applied across two stainless steel electrodes having dimensions of 10.2 x 7.3 x 0.1 cm., maintained at a distance of 1.9 cm. apart for two hours. The initial current of 0.8 ampere dropped gradually to 0.1 ampere toward the end of the deposition. A cam arrangement was used to raise the electrodes in and out of the mixture at 10 cycles per minute, to provide layer-bylayer drying of the deposited membrane. After two hours, 0.32 gram of an invertase-collagen immobilized enzyme-membrane complex was produced at the cathode.

The membrane produced was dried at room temperature for 4 hours on the electrode, and removed after drying. The dried film was stirred for 10 minutes in 90 ml. of tanning agent (11.67 by weight percent chromium sulfate solution aged for 30 days), followed by a 2 minute washing in cold water. This dried and tanned invertase-collagen complex was used in the following experiment to hydrolyze sucrose.

The immobilized enzyme-membrane complex of invertase-collagen was used to catalyze the inversion of 35 cc. of a 6% buffered sucrose solution (pH 5). The hydrolysis reaction was followed polarimetrically by noting changes in the optical rotation of the solution over a period of time. Table 1 shows the reuseability of the invertase-collagen complex, indicating good retention of activity after the first two initial washings.

TABLE 1

Reusability of the electro-codeposited invertase-collagen complex

| Sequence numbers of repetitice sucrose hydrolysis reaction: | Percentage conversion in 25 min. of contact time (25° C., pH 5) |
|---|---|
| 1 | 68 |
| 2 | 50 |
| 3 | 28 |
| 4 | 31 |
| 5 | 31 |
| 6 | 31 |
| 7 | 30 |
| 8 | 31 |
| 9 | 31 |
| 10 | 34 |
| 11 | 34 |
| 12 | 31 |
| 13 | 31 |
| 14 | 31 |
| 15 | 30 |

At the completion of each run, the complex was washed with one liter of distilled water. The complex was stored in dry condition at 5° C. when not in use.

EXAMPLE 7

This example illustrates the preparation of an invertase-triazine-collagen immobilized enzyme-membrane complex.

One gram of invertase dissolved in water was added to 100 ml. of a 1% collagen dispersion and stirred for 30 minutes. 7.3 mg. of triazine dissolved in 30 ml. of methanol was then added slowly with stirring. Water was added to bring the volume of the mixture to 250 ml., and stirring was continued for 3 hours. The pH was adjusted to 3 with dilute lactic acid.

Using the electrodes and cam arrangement of Example 1, a 50 volt potential was applied for 1½ hours. 130 mg. (dry weight) of membranous invertase-triazine-collagen complex was deposited on the cathode. After drying, the film was peeled off the electrode, washed with 2 liters of water, and assayed for invertase activity. Using 35 ml. of a 6% sucrose solution at 28° C. and pH 5 as the substrate, an initial sucrose conversion of 34% was obtained in 25 minutes of contact time. Three additional runs were carried out, with the complex subjected to washing with 1 liter of water between runs. These three runs showed sucrose conversions of 33, 30, and 27 percent, respectively, indicating good retention of invertase activity.

EXAMPLE 8

This example demonstrates the outstanding stability of aged lysozyme-collagen immobilized enzyme-membrane complexes prepared in accordance with the present invention.

500 mg. lysozyme was dissolved in water, added to 100 ml. of a collagen dispersion and brought to a volume of 300 ml. with distilled water. The pH was adjusted to 3, the acidified mixture stirred for 15 minutes, and then aged by allowing it to stand for one week.

Using the previously described cam arrangement and stainless steel and platinum electrodes as anode and cathode respectively, a 50 volt potential was applied across the electrodes, spaced 1.9 cm. apart, for 2½ hours. A membrane formed at the cathode, and was allowed to dry. 160 mg. of the membrane was peeled off one side of the cathode and assayed over a two minute period with 25 ml. of the substrate described in Example 1. In between assays, the membrane was washed with 500 ml. distilled water. Even after 36 runs, high lysozyme activity was retained. The following table illustrates the outstanding retention of lysozyme activity even after repeated washings:

TABLE 2

| Sequence number of repetitive experiments of lysozyme-collagen membrane action on *Micrococcus lysodeikticus* suspension: | Percent conversion of substrate in 2 minutes of contact time |
|---|---|
| 1 | 66.7 |
| 2 | 68.4 |
| 3 | 68.4 |
| 4 | 66.1 |
| 5 | 65.3 |
| 6 | 64.2 |
| 7 | 60.6 |
| 8 | 61.6 |

EXAMPLE 9

Using materials and methof of Example 4, with a cooling coil pasing through the CMC-triazine-invertase mixture, thin immobilized enzyme-membrane complexes were prepared and deposited on a cellulose acetate film using the apparatus shown in FIG. 3. A doctor blade was utilized to take the film off the roller, while rolls provided a cellulose acetate supporting film at the same lineal speed at which the enzyme-membrane complex was removed. The layered cellulose acetate was passed through nip rolls, and the enzyme-membrane complex on the supporting film was recovered, dried, tanned, and packed into a biocatalytic module. This method is advantageous for membranes which are weak and poorly self-supporting, due to either the materials used or the thickness of the recovered film.

It will be appreciated that while the foregoing disclosure relates to only preferred embodiments of the invention for electro-codeposition of immobilized enzyme-membrane complexes, numerous modifications or alterations may be made by those skilled in the art without departing from the spirit or scope of the invention as set forth in the appended claims.

Accordingly, what is claimed as new and intended to be secured by Letters Patent of the United States is:

1. A process for preparing an immobilized enzyme-membrane complex which comprises:
   (a) preparing an aqueous mixture of an active enzyme and an enzyme immobilizing carrier;
   (b) adjusting the pH of said aqueous mixture to a point at which both said enzyme and said carrier experience charge separation at the molecular or colloidal levels;
   (c) introducing said aqueous mixture into an electrodeposition vessel provided with electrodes comprising at least one cathode and at least one anode;
   (d) applying an electrical potential between said electrodes to deposit an immobilized enzyme-membrane complex of said enzyme and said carrier on the surface of at least one predetermined support; and
   (e) recovering an immobilized enzyme-membrane complex therefrom.

2. The process of claim 1, wherein said electrical potential is from 10 to 100 volts.

3. The process of claim 1, wherein said predetermined electrode is cylindrical, helical, spherical, or conical in shape.

4. The process of claim 1, wherein said enzyme-immobilizing support is a solution or dispersion of polymeric material.

5. The process of claim 4, wherein said polymeric material is collagen, zein, or a cellulosic derivative.

6. The process of claim 1, wherein said enzyme-immobilizing support contains functional groups which covalently bond said enzyme thereto.

7. The process of claim 1, further including the addition of a plasticizer or cross-linking agent to said immobilized enzyme-membrane complex.

8. The process of claim 1, further including drying said immobilized enzyme-membrane complex.

9. The process of claim 8, further including removal of said immobilized enzyme-membrane complex from said electrode.

10. The process of claim 1, wherein sequential layers of immobilized enzyme-membrane complex are alternately deposited and dried.

11. The process of claim 1, wherein continuous casting, drying and stripping of the immobilized enzyme-membrane complex is included.

12. The process of claim 1, wherein heat is removed from said aqueous mixture during electrodeposition.

13. The process of claim 1, wherein metal ions are simultaneously deposited together with said immobilized enzyme-membrane complex onto said predetermined support.

14. The product of the process of claim 13.

15. The process of claim 13, wherein said metal ions are deposited from an electrode.

16. The process of claim 15, wherein said metal ions react chemically with said immobilized enzyme-membrane complex.

17. The process of claim 16, wherein said enzyme immobilizing carrier is collagen, and said metal ions include copper.

18. The process of claim 1, wherein at least two different enzymes are applied to said support.

19. The process of claim 18, wherein said different enzymes are sequentially layered one over the other.

20. The product of the process of claim 19.

21. The process of claim 1, wherein said aqueous mixture of said active enzyme and said enzyme immobilizing carrier is aged prior to electrodeposition.

References Cited
UNITED STATES PATENTS

| | | | |
|---|---|---|---|
| 3,556,969 | 1/1971 | Mizuguchi et al. | 204—181 |
| 3,660,262 | 5/1972 | Spiller | 204—181 |

HOWARD S. WILLIAMS, Primary Examiner

U.S. Cl. X.R.

204—296, 300